Oct. 22, 1957 R. McCOMBE 2,810,368
RESILIENT ENDLESS COLLAR FOR HUNTING DOGS
Filed March 4, 1955
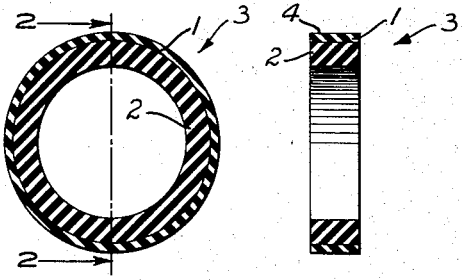
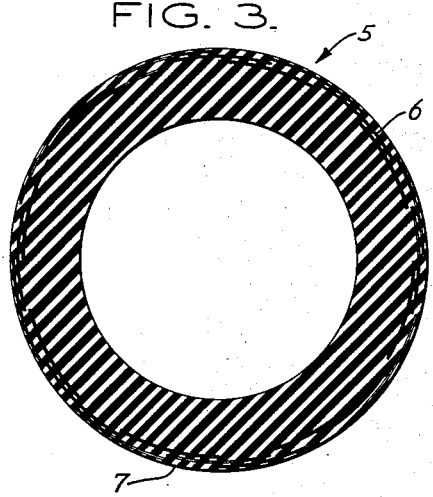
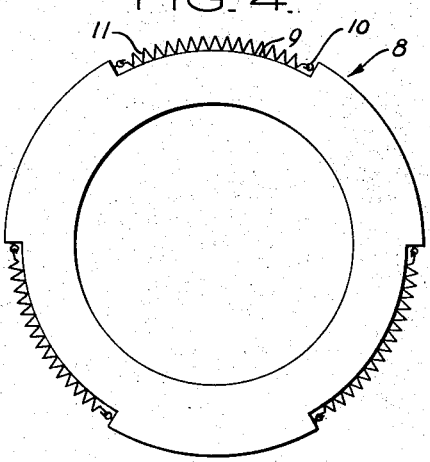
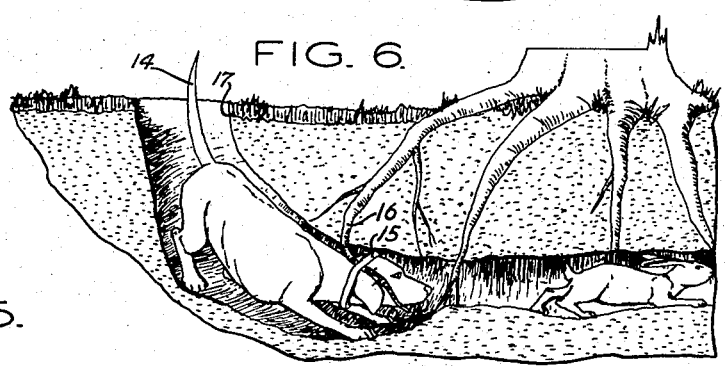
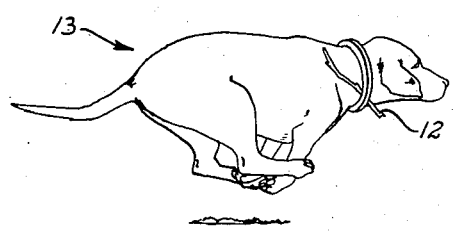
INVENTOR.
RAYMOND McCOMBE
BY
Chapin & Neal
ATTORNEYS

United States Patent Office

2,810,368
Patented Oct. 22, 1957

2,810,368

RESILIENT ENDLESS COLLAR FOR HUNTING DOGS

Raymond McCombe, West Springfield, Mass.

Application March 4, 1955, Serial No. 492,137

6 Claims. (Cl. 119—106)

This invention relates to expandable dog collars and more particularly to an expandable dog collar for use on a dog while hunting.

An object of my invention is to provide a dog collar for purposes of identification, when a dog is actually hunting game, so that if the dog becomes lost a stranger can identify the owner and return the dog to him.

In hunting game a dog intent on following the quarry will travel through thickets and underbrush and the like with the result that broken twigs and branches will become lodged in the ordinary type of collar to greatly hinder his progress and full usefulness for hunting. Furthermore, in some cases an ordinary collar will completely tie up a dog by becoming entangled with a branch or an underground root and the dog cannot free himself from the collar or the object lodged in it.

A further object of the invention is therefore to provide a novel type of collar which will loosely grip the dog's neck and provide an inner portion which can deflect objects from being caught by the collar or can expand sufficiently to permit a broken twig or the like caught in the collar to work free and drop out from between the dog's neck and collar.

Another object of my invention is to provide an identifying dog collar having a readily yieldable inner band portion or layer with an outer less resilient portion, the outer band portion in non-stretched condition being of a size incapable of ordinary removal over the dog's head, but being yieldable to slip over the head under the application of an extraordinary force tending to pull the same forwardly. Thus the collar will permit a dog to free himself in the event the collar becomes hopelessly caught on some object as a branch or root of a tree and the dog cannot otherwise free himself.

The above and other specific objects and advantages will more clearly appear from the following detailed description of the new collar, with particular reference to the accompanying drawings, in which:

Fig. 1 is a vertical sectional view through the body of a new collar embodying the invention;

Fig. 2 is a vertical transverse sectional view on line 2—2 of Fig. 1;

Fig. 3 is a sectional view similar to Fig. 1 and on an enlarged scale, showing a modified form of the new collar;

Fig. 4 is an end elevational view of another modification of the new collar;

Fig. 5 is a pictorial view of a dog with a broken twig caught in his collar; and Fig. 6 is a pictorial view to illustrate the manner in which a dog may free himself from the new collar if it becomes hopelessly caught.

Referring to Fig. 1, one form of the new collar is provided with an outer ring 1 of resilient material as rubber and an inner more resilient ring 2 of resilient material suitably bonded thereto. Preferably the inner ring 2 has a greater cross sectional thickness than the outer ring 1. Rings 1 and 2 can be bonded together by a rubber cement or any other suitable means to form the integral dog collar designated by numeral 3. The dog owner's name may be marked in any suitable manner on the outer surface of the outer ring 1 as at 4 (Fig. 2).

In Fig. 3 another form of collar 5 with a single resilient rubber ring is shown, the ring being provided with a plurality of short strands of wire 6 suitably embedded therein. The strands 6 are in spaced relation and circumferentially disposed inwardly adjacent the outer face of the ring. As shown three series of concentrically arranged sets of wires are provided, portions of the wires in one set overlapping portions of the wires of each of the other sets. Wires 6 serve to restrict radial stretching of the extreme outer section of the ring 5, while at the same time permitting a radial and endwise movement of the inwardly disposed portions of the ring. The dog owner's name can be marked in any suitable manner on the outer surface of the ring as at 7.

In Fig. 4 a third form of collar 8 is shown with a resilient rubber ring having a plurality of recesses 9 in the outer face thereof. At opposite ends of each recess are eyes 10 to which are hooked the ends of releasable tension springs 11. The springs 11 serve to restrict the stretching of the outer circumferential sections of the ring while permitting radial and endwise movement of the inner portions of the ring.

Said springs can be removed from the collar while putting it over the dog's head so as to allow the collar to stretch more easily. The springs can then be placed between said eyes so as to retain said collar around the dog's neck.

The expandable collars 3, 5, and 8 are thus each provided with an inner circumferential section having a certain degree of resiliency and an outer circumferential section having a lesser degree of resiliency and normally restricting the expansion of the inner section. The restriction on the expandability of the outer section is principally for the purpose of maintaining the inner circumference of the collar more or less snugly embracing the neck of a dog while running in the field. The outer section can be expanded, however, so that the collar can be placed on a dog's neck or removed therefrom as desired or to permit the dog itself to withdraw his head in the event the collar becomes hopelessly caught by some object.

The resilient inner section of the collar in snugly embracing the neck will thus prevent in many cases small twigs, branches, and the like from becoming lodged between the collar and neck by deflecting the same. If a twig or branch is lodged under the new collar the resilient character of the inner section in most instances will permit a twig to swing freely as the dog is running along and with sufficient movement to work itself loose and fall out or be knocked or broken out from under the collar as the dog works his way through thickets and underbrush. The stretching ability of the inner section being of a substantially greater magnitude than that of the outer section and being of a greater size cross-sectionally, a twig or branch can easily cause a radial or endwise displacement of the portions adjacent the twig so as to be worked free.

A hound 13 in pursuit of his quarry and with a broken twig 12 lodged between his neck and the new collar is seen in Fig. 5. As the hound runs, various forces such as vibrations from the dog's body, gravity, impact with shrubbery, and the like can operate on the twig. The inner portion of the collar being resilient, the twig will cause the inner portion of the collar to be displaced so as to permit the twig to work itself loose.

Fig. 6 shows how a dog wearing the new collar can by pulling his head through the expanded collar free himself from what would otherwise be a death trap. This view shows the hound caught on an inwardly facing tree root and unable to back out of the enlarged rabbit hole as long as he has his collar around his neck. Forward movement is also blocked due to a tree root partially blocking the rabbit hole passage.

The inside diameter of the new collar is preferably of a smaller diameter than that of a conventional collar, for a given dog, as the collar will immediately and easily stretch to permit a dog to have substantially as much freedom about the neck as he would have with a larger non-resilient dog collar.

What is claimed is:

1. A dog collar comprising a resilient rubber ring of uniform cross-sectional dimension throughout said ring formation with a continuous unbroken inner edge surface having a series of short strands of wire arranged in spaced relation and circumferentially disposed adjacent the outer face of said ring, said wires forming an outer section of less resilient character than the inner section of said ring.

2. A dog collar comprising a resilient rubber ring with a continuous unbroken inner edge surface and having a plurality of tension springs disposed arcuately about the outer face of said ring, means to attach said springs to said ring, said springs restricting the expandability of the outer portion of said ring whereby said outer portion is made less resilient than the inner section of the ring.

3. A dog collar comprising a resilient ring of rubber with a continuous unbroken inner edge surface and having a plurality of circumferentially arranged recesses in the outer face portion of said ring and a tension spring disposed in each of said recesses, said springs being releasably tensioned between the ends of the recesses, whereby the outer section of said ring is of less resiliency than the inner section thereof.

4. A collar for hunting dogs comprising an endless resilient ring having a freely elastic inner circumferential section with a continuous unbroken inner edge surface and adapted in relaxed condition to hug the neck of a dog and an outer circumferential section of substantially less resiliency limiting the deformation of said inner section and yieldable only on the application of stretching forces of greater magnitude for intentional withdrawal of the collar over the head of a dog.

5. The structure of claim 4 in which said resilient ring is of rubber and of uniform cross-sectional dimension throughout said ring formation.

6. The structure of claim 5 in which said inner and outer sections comprise separate layers of rubber integrally bonded together.

References Cited in the file of this patent

UNITED STATES PATENTS

| 904,530 | Harlow | Nov. 24, 1908 |
| 2,361,108 | Johnson | Oct. 24, 1944 |
| 2,684,315 | Spicer | July 20, 1954 |

FOREIGN PATENTS

| 253,142 | Switzerland | Nov. 1, 1948 |